May 16, 1944.   H. KETEL   2,348,977
FIFTH WHEEL
Filed Feb. 22, 1943   2 Sheets-Sheet 1

Inventor
Henry Ketel
By *(signature)*
Attorneys

May 16, 1944.  H. KETEL  2,348,977
FIFTH WHEEL
Filed Feb. 22, 1943  2 Sheets-Sheet 2

Inventor
Henry Ketel.
By Livana & Vanderhoop
Attorneys

Patented May 16, 1944

2,348,977

UNITED STATES PATENT OFFICE 2,348,977

FIFTH WHEEL

Henry Ketel, Holland, Mich.

Application February 22, 1943, Serial No. 476,755

8 Claims. (Cl. 280—33.1)

This invention relates to fifth wheels, extensively used in connecting trailers to trucks or tractors. The trailers are large and heavy in many cases and their connection to and disconnection from the truck by utilization of a fifth wheel construction has in general required the services of the driver and of another.

It is a primary object and purpose of the present invention to provide a novel fifth wheel construction having means whereby the connection and disconnection of the trailer may be readily effected without the services of another man, the driver alone accomplishing all of the necessary work and operations. To this primary end I have provided the novel fifth wheel construction described in the following description and shown in the accompanying drawings, in which, Fig. 1 is a plan view of the fifth wheel construction of my invention.

Like reference characters refer to like parts in the different figures of the drawings.

Figure 1:
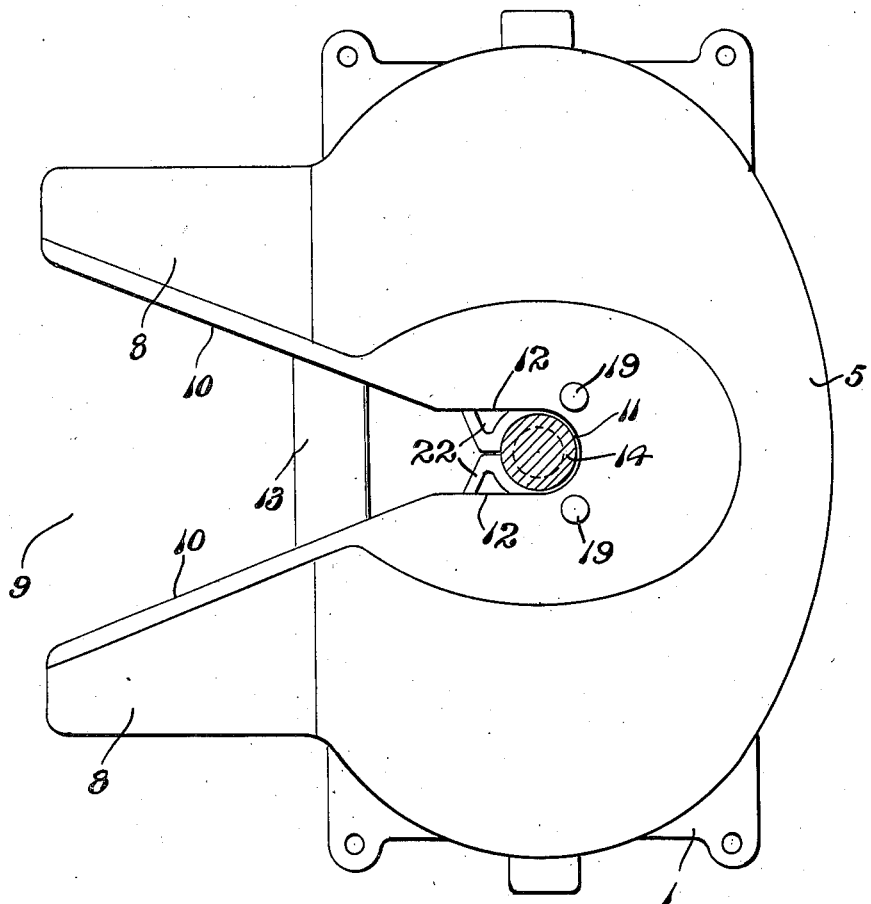

The fifth wheel connection comprises a lower base 1 adapted to be secured to the rear of the truck and having spaced upwardly extending ears or posts 2 alongside of which downwardly extending ears 3 integral with and projecting downwardly from spaced vertical ribs 4 of the fifth wheel body member 5 extend, with suitable pivot pins 6 passing through the ears to pivotally connect the parts together. The fifth wheel body 5 includes an upper substantially horizontal plate with a downwardly extending flange 7 at its curved outer portions at one side. At the opposite side it includes two spaced apart sides 8, one at each side of a relatively wide V-shaped entrance 9, the inclined sides 10 of which guide a locking pin attached to and extending downwardly from the front end of the trailer into a U-shaped recess to receive it, the recess having a curved inner side 11 and two spaced apart parallel sides 12 as shown in Fig. 1. Cross bars 13 and 13a spaced from each other extend between and are cast integral with the spaced ribs 4 to strengthen and reinforce the fifth wheel body member.

Figure 2:
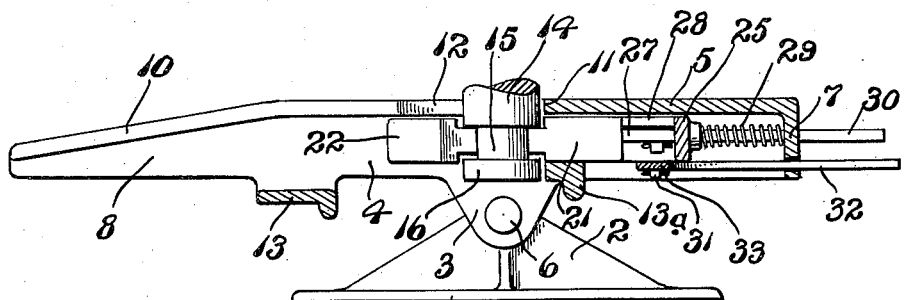
Fig. 2 is a substantially central vertical transverse section therethrough.
Figure 3:
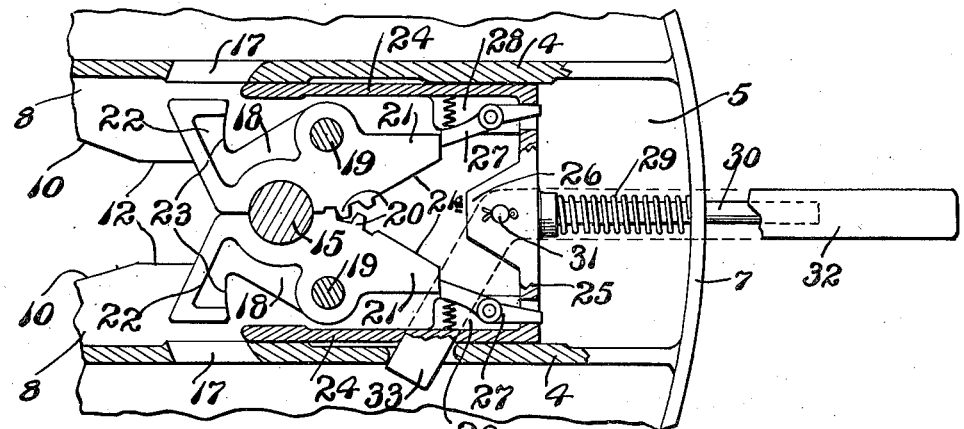
Fig. 3 is an under plan view and horizontal section through the trailer showing the relation of the parts when the locking yoke has been retracted and held in such retracted position preparatory to disconnecting the truck from the trailer.
Figure 4:
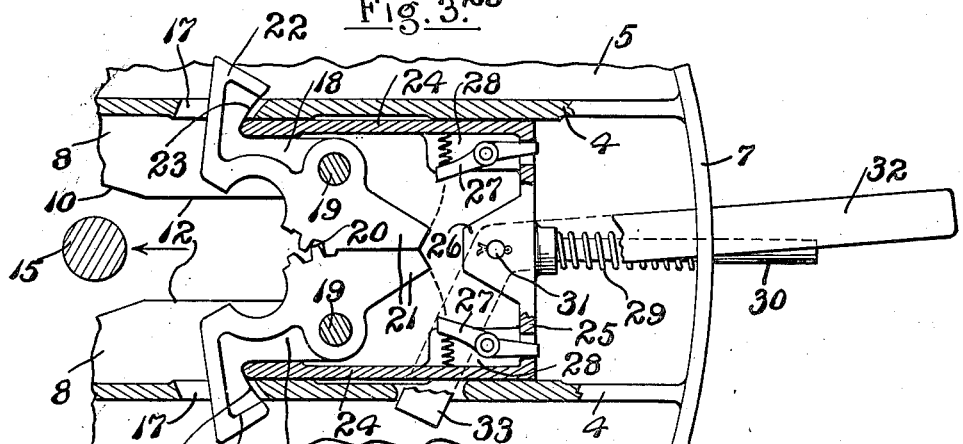
Fig. 4 is a similar view showing the position of the parts upon a forward movement of the truck with respect to the trailer effecting disconnection.
Figure 5:
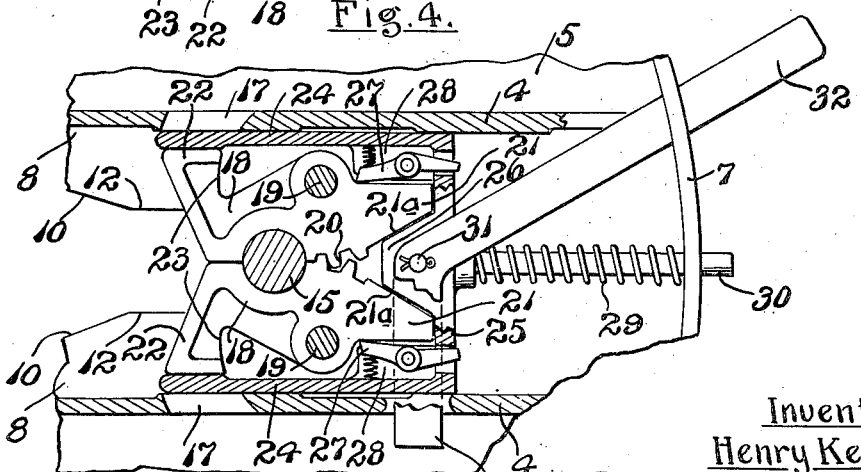
Fig. 5 is a similar view showing the operative locked position of the fifth wheel construction with the truck and trailer connected together.

The locking pin attached to and extending downwardly from the lower side and at the front end of the trailer is a heavy cylindrical pin 14 which at a short distance above its lower end is provided with a continuous annular groove, leaving a short section 15 of less diameter, and with a head or collar 16 at the lower end of the same diameter as the body of the pin 14 (Fig. 2). The ribs 4 opposite the sides 12 of the pin receiving recess each have an opening 17 therethrough as shown in Figs. 3 to 5 inclusive.

A pair of locking pin engaging jaws 18 are pivotally mounted between their ends on pivots 19 carried by the body 5 of the fifth wheel. The jaws approach each other and have intermeshing gear teeth 20 thereon which cause the jaws to simultaneously and equally move in their opening and closing movements. Each of the jaws has a tail-piece 21 extending from the pivots 19 in a direction toward the flange 7, the inner side edges 21a of the tail pieces 21 coming against each other when the jaws are open as in Fig. 4, and occupying angular positions with reference to each when the jaws are closed as in Figs. 3 and 5.

In the opposite direction away from the pivots 19 the jaws have lateral extensions 22 which pass through the openings 17 when the jaws are opened. The inner edges 23 of the lateral extensions 22 are curved on the arc of a circle, the center of which is the axis of the associated pivot pin 19 on which a jaw is mounted. The pivot pins 19 are located substantially at the closed end 11 of the U-shaped recess in the body 5 and the forwardly extending parts of the jaws at adjacent sides are provided with semi-circular recesses so that when the jaws are closed they are adapted to close around the reduced diameter section 15 of the trailer carried locking or connecting pin 14.

A locking yoke is slidably mounted and guided between the ribs 4, having spaced sides 24 one against the inner side of each rib 4 and a cross connecting bar 25 at the inner ends of the sides 24. From the bar 25 a wedge shaped projection 26 extends in the direction of the jaws; and in the operative position, as in Fig. 5, it is located between the tail piece 21 thereof. A dog 27 normally actuated by a light coiled compression spring is pivotally mounted one adjacent each of the sides 24 of the yoke and inwardly therefrom. The mounting is upon supporting lugs or shelves 28 cast integral with the locking yoke. One end of each of the dogs extends toward a jaw 18 and the other ends pass through openings in the cross bar 25.

The yoke is normally moved in a direction to have the free end portions of its sides 24 pass across and close the openings 17 by a heavy coiled compression spring 29 located around a rod 30 having one end secured to the bar 25 of the yoke and extending therefrom through an opening in the flange 7 of the body 5. On a pivot pin 31 on the projection 26 a bent lever is pivotally mounted having two arms 32 and 33 located at an angle to each other. The arm 33 extends through an opening in one of the ribs 4. The other arm 32 extends through an opening in the flange 7 as shown. The arm 32 supplies a handle for the lever to be manually grasped to turn the lever about its pivot.

In Fig. 5 the construction is in operative position, the jaws 18 engaging with the pin 14 at the reduced portion 15 thereof, the sides 24 of the locking yoke at their free end portions covering the openings 17 and interposing between said openings and the lateral extensions 22 of said jaws. This locks the jaws against pivotal movement which would release the pin therefrom. The wedge shaped projection 26 is located in the recess between the tail pieces 21 of the jaws. The dogs 27 bear against the side edges of said tail pieces 21. To release the trailer from the truck the handle 32 is operated to turn the releasing lever about the pin 31 from the position shown in Fig. 5 to that shown in Fig. 3. The arm 33 of the lever bearing against a side of the opening in the rib 4 through which it passes as a fulcrum, the yoke is retracted until the dogs 27 pass by the ends of the tail pieces 21 and under the influence of the light springs engaged thereagainst swing into position back of the ends of said tail pieces as in Fig. 3. This provides positive stops whereby the yoke is held in the position shown in Fig. 3 against the force of the compressed spring 29 tending to move it back to its initial position as in Fig. 5.

The driver of the truck having manipulated the yoke moving lever as described to pull the yoke to the position shown in Fig. 3, in which it is retained, may then return to the truck and moving it forward the pin 14 will disengage from the jaws, spreading them apart as in Fig. 4, thereby releasing the truck from the trailer. The lateral extensions 22 of the jaw pass outwardly through the opening 17 in the ribs 4. As the jaws are opening and when they have moved to partially open position the tail-pieces 21 thereof moving in toward each other will disengage from the dogs 27, releasing the yoke for forward movement under the pressure of the spring 29. By this time however the lateral jaw extensions 22 will have reached and partially entered the openings 17 so that the free ends of the sides 24 of the locking yoke move only from the position shown in Fig. 3 to that shown in Fig. 4 in which they engage against the curved inner edges 23 of said extensions 22. Such forward movement of the yoke is only a short distance approximating one-quarter, three-eighths, or one-half of an inch in practice. Due to the curved edges 23 on a radii, the centers of which are coincident with the axes of the pivot pins 19, the jaws may be continued to open position and the trailer carried connecting pin 14 wholly released, with the parts of the fifth wheel construction occupying substantially the positions shown in Fig. 4.

To reconnect the truck and trailer the truck is backed into position with the locking pin 14 entering the V-shaped entrance at 9 being guided by an inclined side thereof against which it may strike and thence by the sides 12 to pass between the open jaws, with the parts as in Fig. 4, to strike against them with a turning of the jaws to bring them together against the pin. The tail pieces 21 will strike against the dogs 27, as indicated in dotted lines in Fig. 4, swinging them about their pivots or from the position shown in Fig. 4 to that shown in Fig. 5, and as soon as the lateral jaw extensions 22 pass by the free ends of the sides 24 of the yoke, said yoke will be forced by the compressed spring 29 to its operative locking position as in Fig. 5, the ends of the dogs 27 riding against the outer edges of the tail pieces 21.

The construction described has in practical test and use proven exceptionally satisfactory. It is strong and durable and with it the desired handling, connection and disconnection of trucks and trailers solely by the driver of the truck is effectively accomplished.

The invention is defined in the appended claims and is to be considered comprehensive of all forms of structure coming within their scope.

I claim:

1. A fifth wheel body having spaced apart guiding ribs, each with an opening therethrough, jaws pivotally mounted on said body one adjacent each rib, each jaw having a lateral extension adapted to pass through an adjacent rib opening, a locking yoke having sides in one position obstructing said openings and preventing unclosing movement of the jaws, spring means normally moving said locking yoke into locking position, means for manually retracting the yoke to uncover said openings, means coacting between said yoke and said jaws when the yoke is retracted to a predetermined position to hold the yoke in retracted position with said openings uncovered, said holding means being automatically disengaged from the jaws when they are pivotally opened and said lateral projections passed through said openings thereby releasing the yoke, said sides of the yoke engaging against edges of said lateral extensions to the jaws and the yoke prevented from returning to position to close said openings, said jaws upon being turned to closed position disengaging from said yoke to permit it to return to position to close said openings under the influence of the spring means acting on the yoke.

2. A fifth wheel body having an entrance for the passage thereinto of a cooperating connecting pin, said body having spaced apart guiding ribs thereon parallel to each other, a pair of jaws pivotally mounted on said body between the ribs having recesses in adjacent sides to receive the connecting pin, each of said jaws having adjacent the recess therein and outwardly from the pivot of the jaw a lateral extension, and each of said ribs having an opening located for a lateral extension of the adjacent jaw to pass therethrough when the jaw is turned outwardly about its pivot, a locking yoke having sides bearing against the inner sides of said ribs, spring means for forcing the yoke in one direction to cause said sides to cover the openings in the ribs, manually operable means connected with the yoke for moving it against said spring means to uncover said openings, movable stop means carried by the yoke adapted to engage with the jaws when said locking yoke is retracted a predetermined distance to hold the yoke in a retracted position with said openings in the ribs uncovered whereupon the jaws may be turned about their pivots to separate them from a connecting pin engaged therewith, said movement of the jaws disassociating them from said yoke holding means to permit a return of the yoke toward opening covering position until the sides of the yoke engage against said lateral extensions to the jaws.

3. A fifth wheel body having an entrance passage at one side for the passage thereinto of a cooperating connecting pin, said body having spaced apart parallel guiding ribs, one at each side of the entrance passage, each of said ribs having an opening therein, a pair of jaws pivotally mounted on said body between said ribs, said jaws having recesses in adjacent sides to receive the connecting pin, and each of said jaws adjacent the recess thereof and extending outwardly therefrom having a lateral extension positioned to pass through an adjacent opening in a rib when the jaws are turned to open position, each of said jaws having a tail piece extending inwardly, a locking yoke having spaced sides connected at their inner ends by a cross bar movably mounted between said ribs, spring means normally forcing the locking yoke in a direction to bring the sides thereof over said openings in the ribs and between said openings and the ends of said lateral extensions thereon to hold the jaws in closed position, manually operable means connected with said yoke for moving it against said spring means to uncover the openings in said ribs, spring actuated dogs mounted on said yoke one for each jaw having free end portions normally bearing against the side of the tail pieces of the jaws and moving inwardly toward each other upon passage of said dogs beyond the ends of said tail pieces and serving to hold said yoke in retracted position when the jaws are closed but disengaging from said tail pieces on said jaws being opened and said lateral extensions thereof moved outwardly into the openings in said ribs, as and for the purposes specified.

4. A construction containing the elements in combination defined in claim 3, said jaws at adjacent portions thereof having interengaging gear teeth on pitch radii the centers of which are coincident with the axes of the pivots of said jaws.

5. A construction containing the elements in combination defined in claim 3, the inner edges of said lateral extensions to the jaws having arc shaped form struck on radii extending therefrom to the axes of the pivots of the associate jaws.

6. A fifth wheel construction including a pair of pivoted jaws movable to open or closed positions, a yoke movable to a position straddling movable portions of said jaws to lock the jaws in closed position and movable to unlocking positions, a strong spring urging said yoke to locked position, manual means for moving the yoke to unlocked position against tension of said spring, latch means interengageable between said yoke and said jaws to hold the yoke in unlocked position when the jaws are closed and automatically released by opening movement of the jaws, a surface on a jaw curved on an arc concentric with the pivot of the jaw and engageable with said yoke to hold the yoke in unlocked position when the jaws are opened and automatically disengaged when the jaws are closed to permit the yoke to move to locked position.

7. A fifth wheel construction including a pair of pivoted jaws movable to open or closed positions, a yoke movable to a position straddling movable portions of said jaws to lock the jaws in closed position and movable to unlocking positions, a strong spring urging said yoke to locked position, manual means for moving the yoke to unlocked position against tension of said spring, a tail piece on a jaw and a dog on the yoke interengaging to hold the yoke in unlocked position when the jaws are closed and automatically released by opening movement of the jaws, other interengaging means between said jaws and said yoke to hold the yoke in unlocked position when the jaws are opened and automatically disengaged when the jaws are closed to permit the yoke to move to locked position.

8. A fifth wheel body having a connecting pin entrance opening, a pair of jaws pivoted to said body to embrace said connecting pin when in closed position, movable means for locking the closed jaws against movement, manual means for retracting said locking means, stop means coacting between said jaws and said locking means acting to hold the locking means in inoperative position, said stop means automatically disengaging said jaws upon movement of the jaws to unclosed position and a surface on a jaw concentric with the pivot thereof engageable with the locking means when the jaws are moved to unclosed position acting to hold the locking means in inoperative position.

HENRY KETEL.